United States Patent

Brotman et al.

[11] Patent Number: 5,917,890
[45] Date of Patent: Jun. 29, 1999

[54] DISAMBIGUATION OF ALPHABETIC CHARACTERS IN AN AUTOMATED CALL PROCESSING ENVIRONMENT

[75] Inventors: Lynne Shapiro Brotman, Westfield; James M. Farber, Rumson; Benjamin J. Stern, Morris Township, all of N.J.

[73] Assignee: AT&T Corp, Middletown, N.J.

[21] Appl. No.: 08/581,716

[22] Filed: Dec. 29, 1995

[51] Int. Cl.[6] .................................................. H04M 1/64
[52] U.S. Cl. ........................................ 379/88.01; 704/275
[58] Field of Search ................................. 379/67, 77, 88, 379/89, 201, 213, 354, 355, 67.1, 88.01; 395/2, 2.4, 2.6, 2.61, 2.62, 2.63, 2.64, 2.66, 2.79, 2.84; 704/231, 251, 252, 253, 254, 255, 270, 275

[56] References Cited

U.S. PATENT DOCUMENTS

| | | |
|---|---|---|
| Re. 31,188 | 3/1983 | Pirz et al. . |
| 3,928,724 | 12/1975 | Byram et al. . |
| 4,355,302 | 10/1982 | Aldefeld et al. . |
| 4,593,157 | 6/1986 | Usdan . |
| 4,608,460 | 8/1986 | Carter et al. ............................. 379/213 |
| 4,649,563 | 3/1987 | Riskin . |
| 4,650,927 | 3/1987 | James . |
| 4,782,509 | 11/1988 | Shepard ..................................... 379/88 |
| 5,125,022 | 6/1992 | Hunt et al. . |
| 5,127,043 | 6/1992 | Hunt et al. . |
| 5,131,045 | 7/1992 | Roth . |
| 5,163,084 | 11/1992 | Kim et al. . |
| 5,303,299 | 4/1994 | Hunt et al. . |
| 5,384,833 | 1/1995 | Cameron . |
| 5,392,338 | 2/1995 | Danish et al. . |
| 5,454,063 | 9/1995 | Rossides ............................... 395/2.84 |
| 5,638,425 | 6/1997 | Meador, III et al. ..................... 379/88 |
| B1 4,427,848 | 8/1994 | Tsakanikas . |

Primary Examiner—Scott L. Weaver

[57] ABSTRACT

Automated capture of an uttered alphabetic character is provided by using an input, beyond the uttered alphabetic character, to disambiguate an incorrectly captured character. The input is an indication of a telephone key representing the uttered alphabetic character. The indication can be a dual tone multifrequency signal or an utterance of the number of the telephone key. Alternatively, the input is an indication that the incorrectly captured alphabetic character differs from the uttered alphabetic character.

5 Claims, 3 Drawing Sheets

DISAMBIGUATION OF ALPHABETIC CHARACTERS IN AN AUTOMATED CALL PROCESSING ENVIRONMENT

BACKGROUND OF THE INVENTION

The present invention relates to automated call processing, and, more particularly, is directed to capturing alphabetic characters in an automated call processing environment.

Automated call processing has achieved widespread usage. Applications include call routing, voice mail, directory assistance, order processing, information dissemination and so forth.

However, existing telephone based services in which a caller is interacting with a computer do not capture alphabetic character strings with a high degree of accuracy when the strings comprise letters which are selected from an unlimited or very large domain, such as names. Since the set of character strings cannot be defined in advance, the string must be spelled as it is captured.

Automatically capturing alphabetic spelled character strings using only voice input is not feasible presently because letter recognition accuracy is too low with available voice recognition technology. For example, it is difficult to automatically distinguish "B" from "P".

Methods of automatically capturing alphabetic spelled character strings using only dual tone multifrequency (DTMF) input from a twelve-key keypad on a telephone set are cumbersome, as each telephone key does not uniquely map to a single alphabetic character. Consequently, multiple inputs per letter are required for disambiguation, e.g., to indicate "K" press "5" twice or press "5", "2". These methods are also error-prone due to the problem of the user accidentally pressing the wrong key or multiple keys and being unaware of the error, the so-called "fat finger" effect.

SUMMARY OF THE INVENTION

Automated capture of an uttered alphabetic character is provided in accordance with the principles of this invention by using an input, beyond the uttered alphabetic character, to disambiguate an incorrectly captured character.

In an exemplary embodiment of this invention, at least one uttered alphabetic character is captured by receiving a signal indicative of the uttered alphabetic character, automatically finding a first candidate alphabetic character corresponding to the received signal, inquiring whether the first candidate alphabetic character is the uttered alphabetic character, and receiving an input for use in disambiguating the received signal when the first candidate alphabetic character differs from the uttered alphabetic character.

The input is an indication of a telephone key representing the uttered alphabetic character. The indication can be a dual tone multifrequency signal or an utterance of the number of the telephone key. Alternatively, the input is an indication that the first candidate alphabetic character differs from the uttered alphabetic character.

DETAILED DESCRIPTION OF THE PREFERRED EMBODIMENTS

The present invention is related to the invention of U.S. patent application Ser. No. 08/580,702, filed Dec. 29, 1995, the disclosure of which is hereby incorporated by reference.

In an automated call processing scenario, for example, a caller, also referred to herein as a user of the automated call processing system, is assumed to have decided that he or she wishes to enter their name or other alphabetic information to the system, for a purpose such as placing an order or receiving information. In this scenario, the user has available only a conventional telephone set, i.e., any telephone set unable to directly transmit alphabetic information across the telephone network, and communicates via this telephone set with the system.

Figure 1:
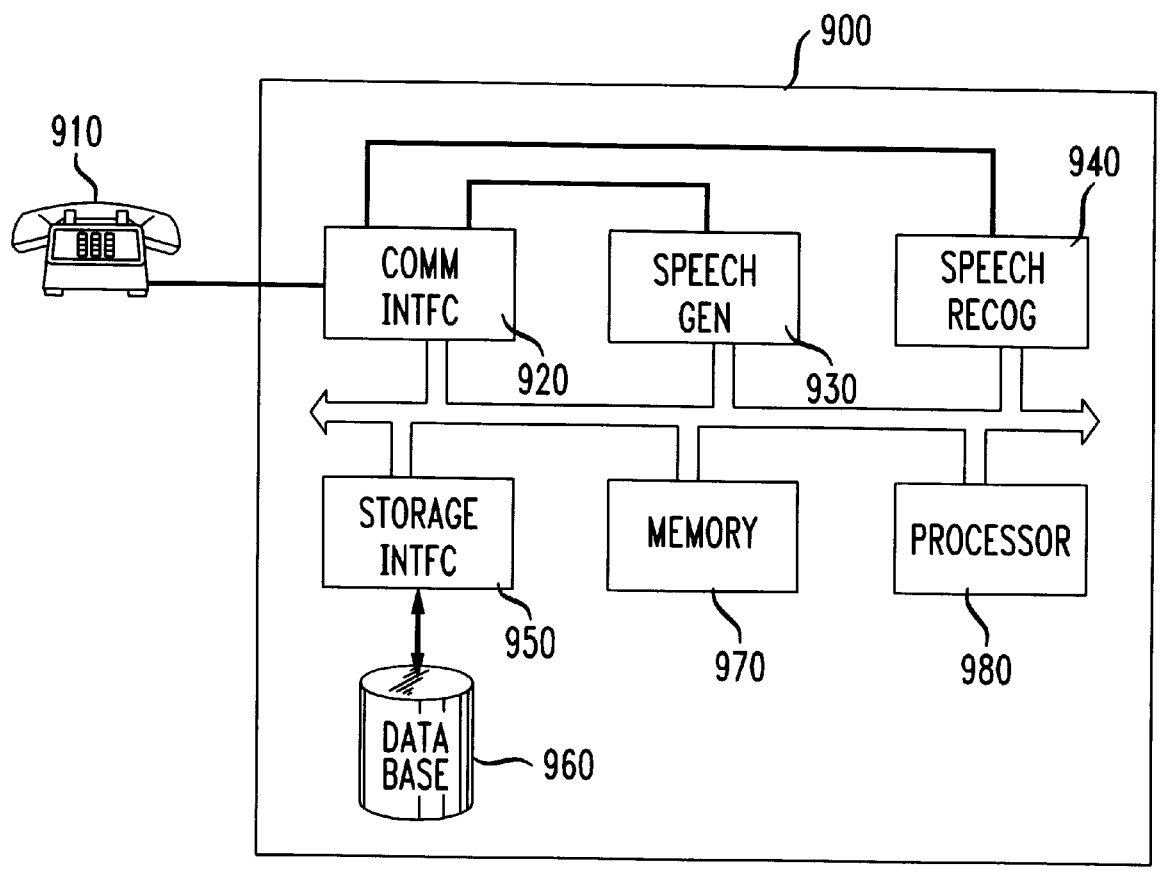
FIG. 1 is a block diagram illustrating a configuration in which the present invention is applied.

Referring now to the drawings, and in particular to FIG. 1, there is illustrated a system 900 in which the present invention is applied. As mentioned, a user is assumed to have access to only a conventional telephone set 910 which communicates with the system 900 using conventional telecommunications facilities such as wired or wireless telecommunications systems known to one of ordinary skill in the art.

The system 900 comprises communications interface (COMM INTFC) 920, speech generation module (SPEECH GEN) 930, speech recognition module (SPEECH RECOG) 940, storage interface (STORAGE INTFC) 950, storage medium 960, memory 970, processor 980 and communications links therebetween.

Communications interface 920 is adapted to receive calls from a user telephone set 910, to supply synthesized speech from speech generation module 930 to the telephone set 910, to forward signals from the telephone set 910 to speech recognition module 940, and to exchange information with processor 980. The system shown in FIG. 1 includes a communications bus and separate communications lines for carrying voiceband signals between the communications interface 920 and each of speech generation module 930 and speech recognition module 940, but one of ordinary skill in the art will appreciate that other configurations are also suitable.

Speech generation module 930 is adapted to receive control commands from processor 980, to generate a voiceband signal in response thereto, and to deliver the generated signal to communications interface 920. Preferably, speech generation module 930 generates synthesized speech in a frequency band of approximately 300–3,300 Hz. In some embodiments, speech generation module 930 may also function to transmit ("play") pre-stored phrases in response to commands from processor 980; module 930 includes appropriate signal storage facilities in these cases.

Speech recognition module 940 is adapted (i) to receive from communications interface 920 a voiceband signal which can be a speech signal or a DTMF signal generated in response to depression of a key on the telephone set 910, (ii) to process this signal as described in detail below and in response to commands from processor 980, and (iii) to deliver the results of its processing to processor 980. As will be appreciated, in some embodiments speech recognition module 940 includes storage for holding predetermined signals and/or for holding speech signals from telephone set 910 for the duration of a call.

Storage interface 950 is adapted to deliver information to and retrieve information from storage medium 960 in accordance with commands from processor 980. The storage medium 960 may be any appropriate medium, such as magnetic disk, optical disk, tape or transistor arrays.

Memory 970 may be implemented by using, for example, ROM and RAM, and is adapted to store information used by processor 980.

Processor 980 is adapted to execute programs for interacting with the user of telephone set 910 in accordance with a control program typically stored on storage medium 960 and also loaded into memory 970. Processor 980 may also communicate with other systems via communications links (not shown), for example, to retrieve user-specific information from a remote database and/or to deliver information captured from the user of telephone set 910 to a remote database.

In a typical call processing operation, the user employs telephone set 910 to place a call to system 900. Communications interface 920 receives the call and notifies processor 980 of an in-coming call event. Processor 980, in accordance with its control program, instructs speech generation module 930 to generate a speech signal. Speech generation module 930 generates the requested speech signal and delivers the generated signal to communication interface 920, which forwards it to the telephone set 910.

In response to the generated speech signal, the user enters information to system 900 via telephone set 910. As described in detail below, the information can be a speech signal or a DTMF signal generated in response to depression of a key on the telephone set 910.

Communications interface 920 (a) receives the user-generated signal; (b) notifies processor 980 that a signal has been received; and (c) delivers the signal to speech recognition module 940. The module 940 processes the signal in accordance with the present invention, as described in detail below, and delivers the result of its processing to processor 980. Based on this result, processor 980 proceeds through its control program, generally instructing speech generation module 930 to request information from the user or to deliver information to the user, and receiving processed user input from speech recognition module 940.

Entry of alphabetic information according to the present invention, from the user to the system, will now be described.

Figure 2:
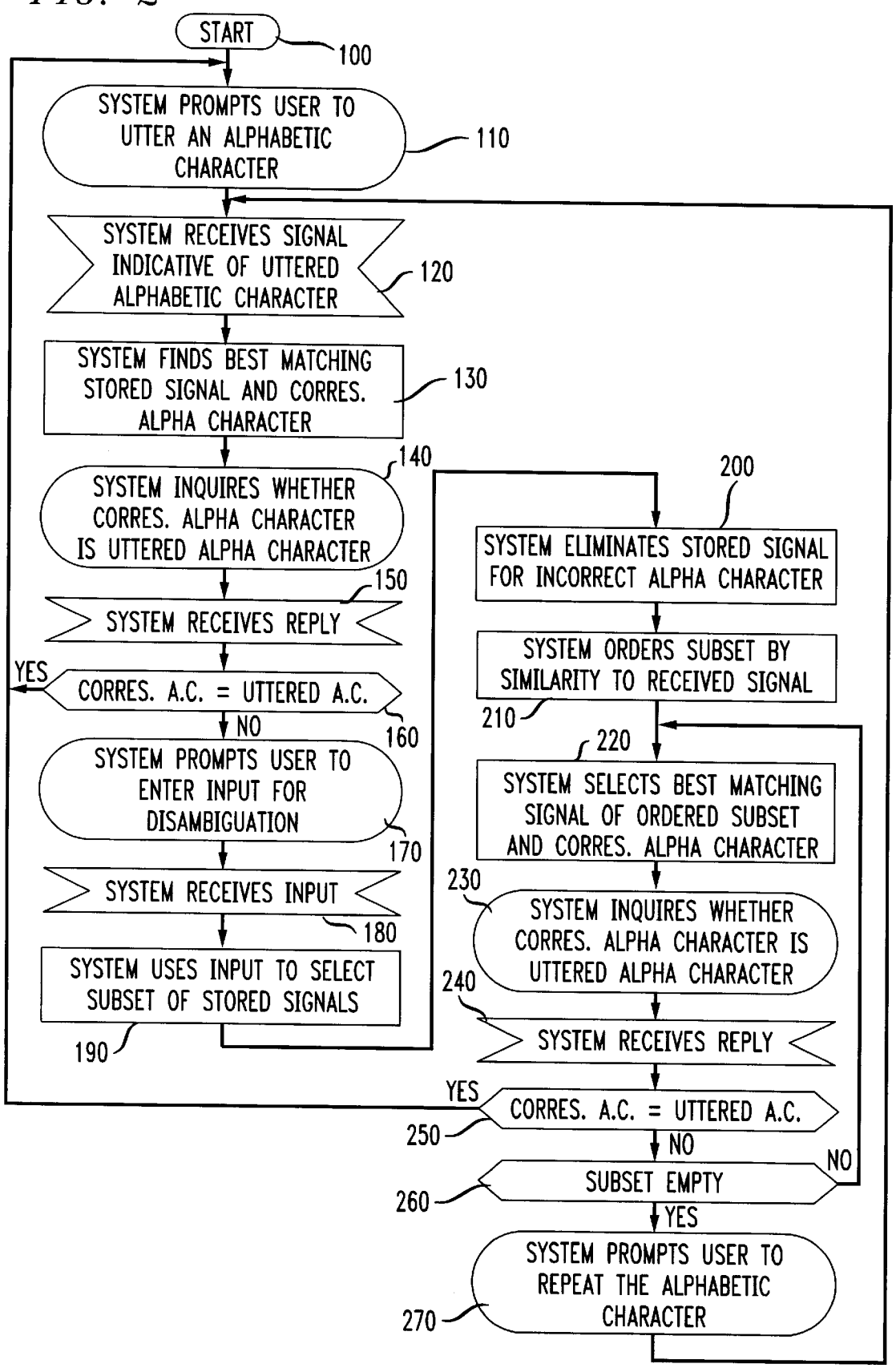
FIG. 2 is a flowchart of a method of automatically capturing an uttered alphabetic character.

FIG. 2 illustrates a flowchart for a method of automatically capturing an uttered alphabetic character. The character capture method illustrated in FIG. 2 generally involves the user uttering a character, and the system presenting what it has determined as the first candidate character to the user. If the first candidate character is correct, that is, the first candidate character is the character uttered by the user, then the system goes on to capture the next character. If the first candidate character is incorrect, then the system asks for an input to aid in disambiguating the uttered character. The input is preferably a DTMF signal for a telephone key. The DTMF signal input narrows the range of possible characters, and in combination with the uttered character, typically results in a correctly identified character.

The flowchart illustrated in FIG. 2 encompasses the actions of the elements shown in FIG. 1. For example, a control and processing program executed by processor 980 will be apparent to one of ordinary skill in the art in view of FIG. 2.

An advantage of the present method is that the user utters only the desired character, and not additional information, when the speech recognition portion of the automated system is capable of correctly capturing the character. In other words, additional user input is required only when the automated capture is inaccurate, to compensate for the inadequacy in voice recognition technology. Therefore, voice recognition technology which has imperfect letter recognition accuracy may now be utilized to provide highly accurate character capture.

At step 110 of FIG. 2, the system prompts the user to utter an alphabetic character. For example, a typical system prompt may be, "Please spell your name, beginning with the first letter." After the first character has been correctly captured, the system prompt may change to, "Please say the next character, or the word "DONE" to go on", or to, "Please say the next character, or press the pound sign to go on."

The user responds by uttering an alphabetic character, such as "N". At step 120, the system receives a signal indicative of the uttered alphabetic character. In this example, the signal represents the utterance "en".

At step 130, the system accesses a set of stored signals representing spoken alphabetic characters. The set generally comprises signals representing the utterances "ay", "bee", "see", "dee", and so on. Some alphabetic characters may have multiple stored signals, such as "zee" and "zed" for "Z". The system compares the received signal with the stored signals, selects the stored signal which best matches the received signal, and finds the alphabetic character corresponding to the best matching stored signal. In this example, the system is assumed to select the stored signal for "em" as the best matching signal.

At step 140, the system inquires whether the alphabetic character corresponding to the best matching stored signal, that is, the first candidate character, is the uttered character. The inquiry is generated using speech generation technology known to one of ordinary skill in the art. Preferably, the system inquiry includes information for assuring that the user correctly understands the alphabetic character presented by the system. For example, the system may inquire, "I understood M as in Mary. Is this correct?" In this example, the additional information is a word "Mary" associated with the best matching alphabetic character "M", where the spelling of the word begins with the best matching alphabetic character. The user replies with, typically, a "yes" or "no" answer, which can be processed by presently available voice recognition technology with a relatively high level of accuracy. At step 150, the system receives the user's reply.

At step 160, the system uses the reply to determine whether the alphabetic character corresponding to the best matching stored signal is the uttered character. If the character selected by the system matches the uttered character, then the system has correctly captured an alphabetic character and goes on to ask for the next character at step 110.

If the character selected by the system does not match the uttered character, then, at step 170, the system prompts the user to enter an input for correctly disambiguating the received signal as the desired character.

Preferably, the user has a telephone set which provides DTMF, and so the system prompt is, "Please touch the telephone key having the desired character." Provision is made for characters which do not correspond to a telephone key, namely, "Q" and "Z", such as assigning them to the "0" key.

Alternatively, the user may be prompted to speak the number of the telephone key having the desired character. This alternative is useful when the caller has a pulse telephone set, i.e., does not have the capability to enter DTMF. Presently available voice recognition technology has a high level of accuracy for recognition of single digits, as compared with the level of accuracy for recognition of spoken alphabetic characters.

At step 180, the system receives the input entered by the user for disambiguating the uttered alphabetic character. For example, the input may be the DTMF generated by depression of the "6" telephone key, corresponding to the letters "M", "N", "O".

In another embodiment, if the character selected by the system does not match the uttered character, then, at step 170, the system prompts the user to speak a word beginning with the uttered character. For example, a system prompt may be, "Please say Nancy if the character is N or Mary if the character is M." Then, at step 180, the system receives the input. In this embodiment, the system is changed to expect an utterance corresponding to one of, e.g., "Nancy" or "Mary". That is, for the input used for disambiguation, the expectations of the speech recognizer regarding the nature of the input change relative to the nature of the input expected initially.

At step 190, the system uses the input to select a subset of the stored signals representing spoken alphabetic characters. In this example, the subset is the stored signals for the letters "M", "N", "O".

At step 200, the system eliminates the stored signals for the first candidate character, which has already been presented to the user, from the subset, if the first candidate character is in the subset. In this example, the system eliminates the stored signal(s) for the letter "M".

At step 210, the system orders the remaining stored signals in the subset by similarity to the received signal. In this example, the received signal is "en", the remaining stored signals in the subset are "en" and "oh", and the ordered subset is {"en", "oh"}.

At step 220, the system selects the best matching signal in the stored subset as the second candidate character, namely, "en", and at step 230, the system inquires whether the second candidate alphabetic character is the uttered character.

At step 240, the system receives the user's reply.

At step 250, the system uses the reply to determine whether the second candidate alphabetic character is the uttered character. If the second candidate character selected by the system matches the uttered character, then the system has correctly captured an alphabetic character and goes on to ask for the next character at step 110.

If the second candidate character selected by the system does not match the uttered character, then, at step 260, the system eliminates the just refused second candidate character from the subset, and determines whether anything is left in the subset. If something is left, then the system goes to step 220 and tries the best remaining character. In this example, if the user refused "en", then "oh" would still remain in the subset, and would be presented to the user.

If nothing is left in the subset, then the system has been unable to correctly capture the uttered character. At step 270, the system prompts the user to re-utter the character, and returns to step 120 to re-try capturing the character. If this is the situation, then at step 130, the system eliminates the signals corresponding to the already refused characters from the stored signals when selecting the best matching stored signal.

Figure 3:
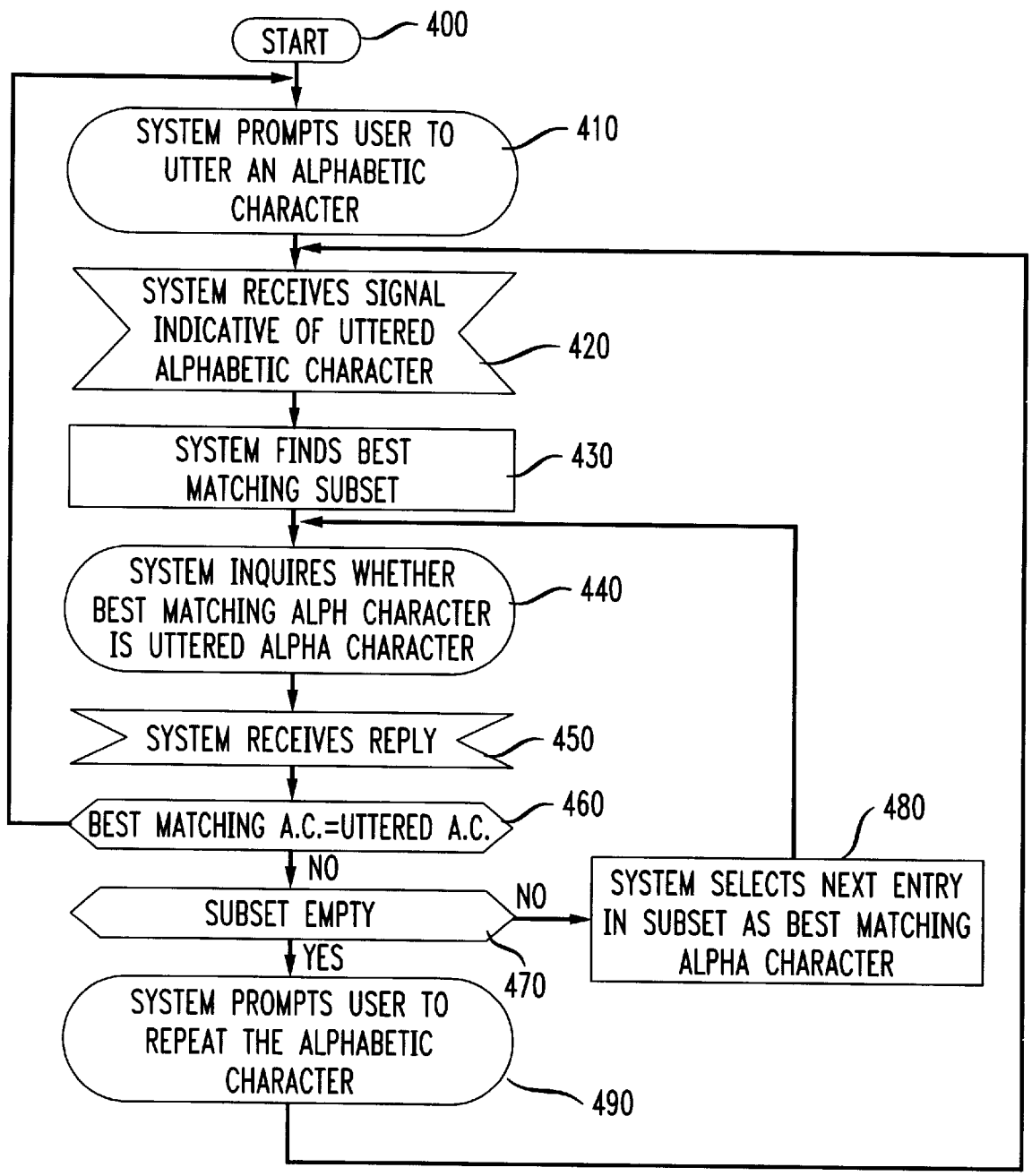
FIG. 3 is a flowchart of another method of automatically capturing an uttered alphabetic character.

Referring now to FIG. 3, there is illustrated a flowchart for another method of automatically capturing an uttered alphabetic character.

The character capture method illustrated in FIG. 3 generally involves the user uttering a character, and the system presenting what it has determined as the best matching character to the user. If the presented character is correct, that is, the presented character is the character uttered by the user, then the system goes on to capture the next character. If the presented character is incorrect, then the system presents its next best matching character to the user and inquires whether this character is correct. In this method, the responses of the user are inputs to aid in disambiguating the uttered alphabetic character.

An advantage of this method is that the user has a very simple structured interaction with the system, that is, the user either accepts or rejects the characters presented by the system. This method also permits voice recognition technology which has imperfect letter recognition accuracy to be utilized to provide highly accurate character capture.

Steps 410 and 420 of FIG. 3 are similar to steps 110 and 120 of FIG. 2, and, for brevity, will not be discussed in detail.

At step 430, the system accesses a set of stored signals representing spoken alphabetic characters, as described above with respect to step 130 of FIG. 2. Preferably, the system selects the stored signals which match the received signal to within a predetermined threshold as the best matching subset, and then orders the selected stored signals by similarity to the received signal to generate an ordered best matching subset.

Alternatively, the system compares the received signal with the stored signals, selects the stored signal which best matches the received signal, finds the alphabetic character corresponding to the best matching stored signal, and performs a table look up for the alphabetic character to obtain an ordered best matching subset.

As yet another alternative, the system compares the received signal with the stored signals, selects the stored signal which best matches the received signal, and finds the alphabetic character corresponding to the best matching stored signal. In this alternative, a best matching subset is generated only when the best matching alphabetic character is rejected by the user.

Steps 440–460 of FIG. 3 are similar to steps 140–160 of FIG. 2, and, for brevity, will not be discussed in detail.

If the best matching character selected by the system does not match the uttered character, then, at step 470, the system determines whether anything is left in the best matching subset. If something is left in the subset, then at step 480, the system selects the next entry in the subset as the best matching alphabetic character, and loops back to step 440 to check whether the user accepts this new best matching alphabetic character.

It will be appreciated that if a best matching subset has not yet been determined, then at step 470, it is necessary to determine the best matching subset, and eliminate the just rejected character from the best matching subset.

If nothing is left in the subset, then the system has been unable to correctly capture the uttered character. At step 490, the system prompts the user to re-utter the character, and returns to step 420 to re-try capturing the character. If this is the situation, then at step 430, the system eliminates the signals corresponding to the already refused characters from the stored signals when selecting the best matching stored signal.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of capturing at least one uttered alphabetic character, comprising the steps of:

receiving a signal indicative of an uttered alphabetic character;

accessing a set of stored signals representing spoken alphabetic characters;

automatically finding a first candidate alphabetic character from the set of stored signals corresponding to the received signal;

inquiring from a user whether the first candidate alphabetic character is the uttered alphabetic character; and receiving an input for use in disambiguating the received signal when the first candidate alphabetic character differs from the uttered alphabetic character, wherein the input is an indication of a telephone key representing the uttered alphabetic character and wherein the telephone key indication is an utterance; and disambiguating the received signal, by automatically finding an alternate candidate alphabetic character that accurately captures the uttered character; wherein the step of automatically finding the alternate candidate alphabetic character includes using the input to compare the stored signals with the received signal until one of the stored signals matches the received signal.

2. A method of accurately capturing at least one uttered alphabetic character, comprising the steps of:

receiving a signal indicative of an uttered alphabetic character;

accessing a set of stored signals representing spoken alphabetic characters;

automatically finding a first candidate alphabetic character corresponding to the received signal;

inquiring from a user whether the first candidate alphabetic character is the uttered alphabetic character;

receiving an input for use in disambiguating the received signal when the first candidate alphabetic character differs from the uttered alphabetic character;

automatically finding a second candidate alphabetic character corresponding to the received signal in accordance with the input, wherein the step of automatically finding the second candidate alphabetic character includes comparing the stored signals with the received signal; eliminating a stored signal representing the first candidate alphabetic character from the stored signals and inquiring whether the second candidate alphabetic candidate character accurately captures the uttered character; wherein automatically finding an alternative candidate alphabetic character; wherein the step of automatically finding includes using the input to compare a selected group of the stored signals representing the spoken alphabetic characters indicated by the input with the received signal until one of the stored signals matches the received signal.

3. Apparatus for capturing at least one uttered alphabetic character, comprising:

means for receiving a signal indicative of an uttered alphabetic character;

means for a set of stored signals representing spoken alphabetic characters;

means for automatically finding a first candidate alphabetic character corresponding to the received signal;

means for inquiring from a user whether the first candidate alphabetic character is the uttered alphabetic character;

means for receiving an input for use in disambiguating the received signal when the first candidate alphabetic character differs from the uttered alphabetic character, wherein the input is an indication of a telephone key representing the uttered alphabetic character and wherein the telephone key indication is an utterance; disambiguating the received signal, by automatically finding an alternate candidate alphabetic character that accurately captures the uttered character; wherein the step of automatically finding the alternate candidate alphabetic character includes using the input to compare a selected group of the stored signals with the received signal until one of the stored signals matches the received signals.

4. The apparatus of claim 3, wherein the utterance represents a number corresponding to the telephone key.

5. Apparatus for capturing at least one uttered alphabetic character, comprising:

means for receiving a signal indicative of an uttered alphabetic character;

means for automatically finding a first candidate alphabetic character corresponding to the received signal;

means for accessing a set of stored signals representing spoken alphabetic characters;

means for inquiring from a user whether the first candidate alphabetic character is the uttered alphabetic character;

means for receiving an input for use in disambiguating the received signal when the first candidate alphabetic character differs from the uttered alphabetic character; and means for automatically finding a second candidate alphabetic character corresponding to the received signal in accordance with the input; wherein the means for automatically finding the second candidate alphabetic character includes means for comparing the stored signals with the received signal and wherein a stored signal representing the first candidate alphabetic character is eliminated from the stored signals indicated by the input; disambiguating the received signal, by automatically finding an alternate candidate alphabetic character that accurately captures the uttered character; wherein the step of automatically finding the alternate candidate alphabetic character includes the step of using the input to compare a selected group of the stored signals representing the first spoken alphabetic characters indicated by the input with the received signal until one of the stored signals matches the received signal.

* * * * *